(12) United States Patent
Bussinger

(10) Patent No.: US 7,412,804 B1
(45) Date of Patent: Aug. 19, 2008

(54) LOG JOISTS AND RAFTER HANGERS

(76) Inventor: Brian Bussinger, 9263 Lewis Rd., Vassar, MI (US) 48768

(*) Notice: Subject to any disclaimer, the term of this patent is extended or adjusted under 35 U.S.C. 154(b) by 468 days.

(21) Appl. No.: 11/070,597

(22) Filed: Mar. 2, 2005

Related U.S. Application Data

(60) Provisional application No. 60/549,460, filed on Mar. 2, 2004.

(51) Int. Cl.
*E04B 7/04* (2006.01)
*E04B 1/10* (2006.01)
*E04B 1/58* (2006.01)
*F16B 7/08* (2006.01)

(52) U.S. Cl. ............................ 52/233; 52/92.2; 52/713; 403/190

(58) Field of Classification Search ........... 52/712–714, 52/289, 702, 92.1–92.3, 93.1–93.2, 233, 52/653.2, 655.1; 248/219.2, 219.4, 218.4, 248/74.1; 285/24, 197, 198, 199, 188; 403/190, 403/191, 233, 235, 237, 335, 337; 256/65.01, 256/65.02, 65.03, 65.06, 67
See application file for complete search history.

(56) References Cited

U.S. PATENT DOCUMENTS

| | | | | |
|---|---|---|---|---|
| 1,019,778 A | * | 3/1912 | Fredrickson | ................ 403/174 |
| 1,728,981 A | * | 9/1929 | Ropp | ........................... 52/702 |
| 1,822,389 A | * | 9/1931 | Blakely | ...................... 403/199 |
| 4,240,369 A | * | 12/1980 | Molz | .......................... 114/106 |
| 5,190,260 A | * | 3/1993 | Daubenspeck | .............. 248/313 |
| 5,247,773 A | | 9/1993 | Weir | |
| 5,426,822 A | | 6/1995 | Weir | |
| 5,607,133 A | * | 3/1997 | Markham et al. | ........... 248/313 |
| 6,254,052 B1 | * | 7/2001 | Hubbard et al. | ............. 248/313 |
| 6,729,588 B2 | * | 5/2004 | Wilkinson, III | ............ 248/74.1 |

FOREIGN PATENT DOCUMENTS

| | | | |
|---|---|---|---|
| EP | 328909 | A1 * | 8/1989 |
| EP | 357273 | A1 * | 3/1990 |

* cited by examiner

*Primary Examiner*—Robert Canfield
*Assistant Examiner*—Christine T Cajilig
(74) *Attorney, Agent, or Firm*—Farris Law, P.C.; Robert L. Farris

(57) ABSTRACT

The log hanger assembly includes a first saddle support, a second saddle support and a saddle member that is pivotally attached to both saddle support. The first and second saddle support include arcuate base plates that are arcs about a log axis with an arc radius that is substantially equal to the log radius of the log to which the base plate and extends outward from the convex side of each base plate. The saddle member is pivotally attached to the posts of the saddle. The saddle member extends 180 degrees around a rafter or moist and has a saddle member axis that is substantially perpendicular to an axis of a log to which the saddle supports are attached.

3 Claims, 2 Drawing Sheets

LOG JOISTS AND RAFTER HANGERS

CROSS REFERENCE TO RELATED APPLICATION

This application claims the benefit of the filing date of U.S. Provisional Application No. 60/549,460 filed Mar. 2, 2004, titled LOG JOISTS AND RAFTER HANGERS.

TECHNICAL FIELD

The joist and rafter hangers are employed for connecting the end of one round log for a roof rafter or a floor joist to the side of a horizontal round log in log building construction.

BACKGROUND OF THE INVENTION

Buildings have been constructed from logs for hundreds of years. Some of these buildings have employed rough logs with the bark still on them. The ends are notched so that one wall joins an adjacent wall at a right angle, and the notches cooperate to lock the two walls together.

By connecting the ends of four such walls together at their adjacent corners a four sided building is constructed. The gaps between adjacent lower and upper logs are filled with material such as wet clay and straw or other fibers. The clay hardens as it dries and forms relatively air tight connections between two logs. However, over time the logs tend to dry and shrink and the bark tends to crumble. As a result the clay cracks, breaks and crumbles. Replacement of the caulking clay or similar material becomes a frequent maintenance requirement.

Bark is generally removed from logs in more recent years to avoid problems associated with bark deterioration. Removal of bark reduces insect problems and reduces problems relating to drying of logs and to shrinkage. However, the problems relating sealing the spaces between upper and lower logs remains.

Builders of some log buildings have chipped wood away to form each log into a beam with a square cross section. Chipping away portions of a log is a labor intensive activity that requires great strength, endurance and time. This system reduces the size of cracks between adjacent logs. However, these cracks must still be sealed to keep water out and reduce the passage of air. Some settling between such beams occurs due to changes in moisture content of the wood and deterioration of the rough outside surfaces.

Logs are shaped by powered cutters to have uniform diameters from one end to the other to make log buildings today. Engaging edges of the logs are also shaped to obtain substantiality air tight mounting surfaces that will shed water. These logs will still dry, warp and settle some over time.

Connections between logs at the corners of walls require hand fitting of the logs. Even with power tools, cutting notches into the sides of logs is a time consuming task. Cutting notches in logs for floor joist as well as for rafters is also a time consuming task. When using notches in two logs to form a right angle connection between the two logs, a substantial amount of wood is removed to form the required joint. The removal reduces the strength of the logs at the connection location. If a notch is cut half way through a floor joist or rafter and a mating notch is cut in a supporting log, the strength of each log may be reduced by half or more. This is a particularly serious problem for floor joists and rafters which are often required to support significant loads.

SUMMARY OF THE INVENTION

The log hanger assembly, includes a first saddle support, a second saddle support and a saddle member. The first saddle support includes a first base plate with at least two first base plate bores for first base plate mounting fasteners. A first post is fixed to the first base plate and extends outwardly from the first base plate. A first post bore extends through the first post.

A second saddle support includes a second base plate with at least two second loose plate bores for second base plate mounting fasteners. A second post is fixed to the second base plate and extends outwardly from the second base plate. A second post bore extends through the second post.

A saddle member includes a semicircular section that extends one hundred and eighty degrees about a saddle axis. The semicircular section includes a semicircular section first end a semicircular section second end. Saddle member free ends are parallel to each other and extend from the semicircular section first end and the semicircular section second end. A first saddle bore extends through the saddle member at the semicircular section first end. A second saddle bore extends through the saddle member at the semicircular section second end. At least one log fastener bore also extends through the semicircular section.

A first bolt extends through the first saddle bore and through the first post bore and pivotally attaches the first saddle support to the saddle member. A second bolt extends through the second saddle bore and through the second post bore and pivotally attaches the second saddle support to the saddle member. The first and second bolts are coaxial when the first saddle support and the second saddle support are both connected to a saddle member.

The first base plate of the first saddle support is an arcuate member with a first plate radius that is substantially equal to the log radius of a log to which it is to be clamped. The second base plate of the second saddle support is an arcuate member with a second plate radius that is substantially equal to the log radius of a log to which it is to be clamped.

BRIEF DESCRIPTION OF THE DRAWINGS

These and other objects, features and advantages will become more readily apparent in view of the following detailed description and best mode, appended claims and accompanying drawings, in which:

DETAILED DESCRIPTION OF THE PREFERRED EMBODIMENTS

Figure 1:
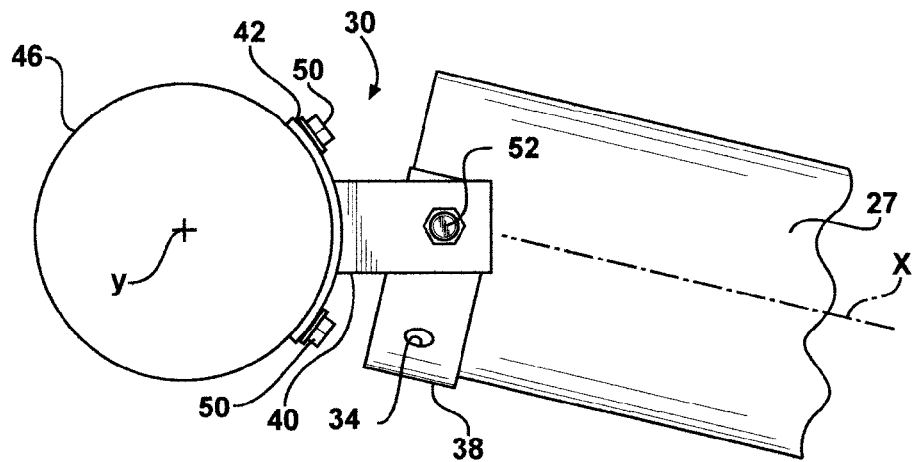
FIG. 1 is a side elevation view of a rafter hanger supporting an upper end of a rafter for a roof with parts removed and parts broken away.

The rafter hangers 30 include a saddle member 38 and two saddle supports 40. Each saddle support 40 has a base plate 42 and a post 44. The base plate 42 is an arcuate member with a radius that is the same as the radius of the log 46 to which it is attached. At least to bores 20 and 22 are provided through the arcuate base 42. A post 44 is welded to the center of each base plate 42 and extend outward from the convex side of the base plate. A bolt 18 receiving bore passes through the free end of the post 44.

Figure 5:
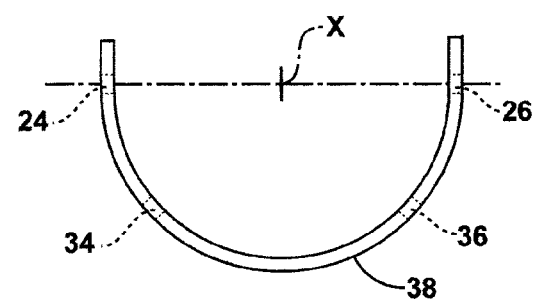
FIG. 5 is an end view of a hanger saddle.
Figure 8:
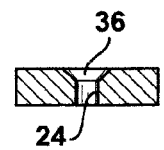
FIG. 8 is a sectional view taken along line 8-8 in FIG. 4.

The saddle member 38 is an arcuate bar with a radius that is the same the radius R of the rafter 27 which it is to support. The saddle member 38 extends more than 180° about its axis X. Bolt bores 24 and 26 are drilled through each free end of the saddle member 38. These bolt bores are 180° apart and are coaxial. Both bolt bores 24 and 26 are counter sunk 36 on the radially inner side as shown in FIG. 8. The ends of the saddle member 38 that extend above the bolt bores 24 and 26 are parallel to each other and tangent to the outer surface of a rafter 27 or joist 60 that is supported as shown in FIG. 5.

Each saddle support 40 is attached to the side of a log 46 by two lag-screws 50 that pass through the bores 20 and 22 through the base plate 42. The saddle member 38 is pivotally attached to each of the two saddle supports 40. A first flat head bolt 52 that passes radially outward through the counter sunk bore 36 on a free end of the saddle member 38, through a post 44 of the saddle support 40 and received a nut 54. A second flat head bolt 52 connects a second end of the saddle supports 40 by flat head bolt 52 the same way the first end of the saddle support is connected to the first saddle support. The nuts 54 and the flat head bolts 52 are tightened after the rafters 27 are supported in place. Lag-screws 55 pass through bores 34 and 36 through the saddle member 38 and screw into the rafter 27.

Figure 2:
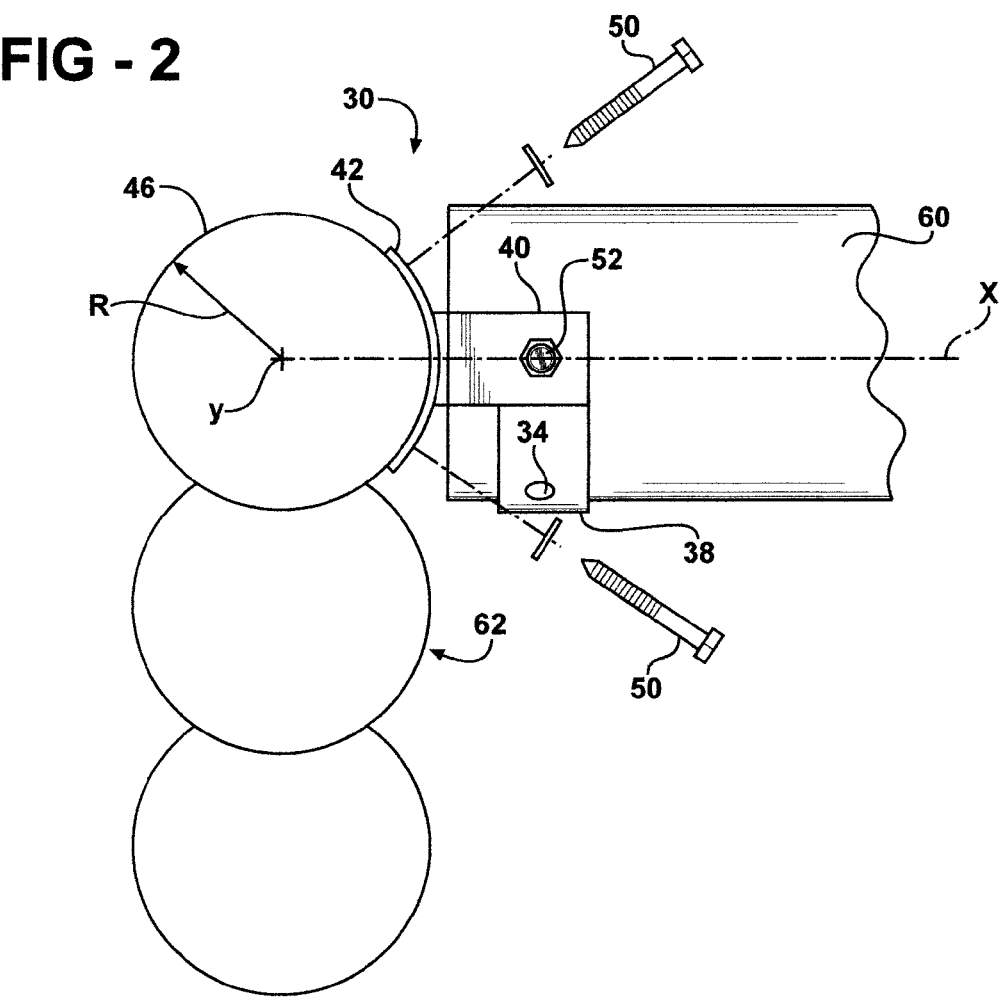
FIG. 2 is a side elevation view of a floor joist hanger with parts broken away.
Figure 3:
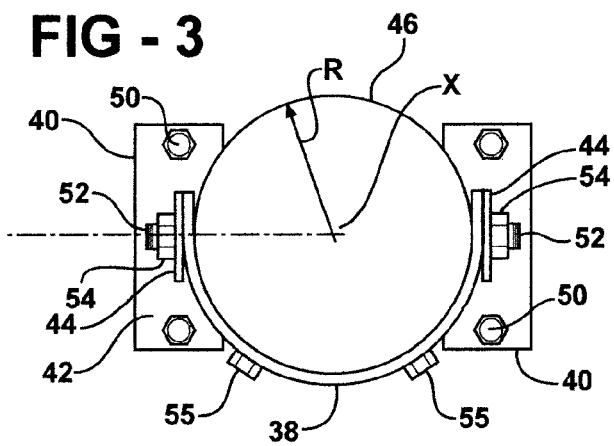
FIG. 3 is an end view of a floor joist and a floor joist hanger.
Figure 4:
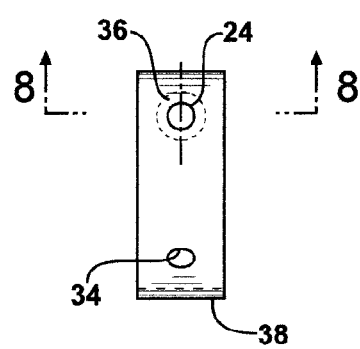
FIG. 4 is a side view of a hanger saddle.

The floor joist hanger 30 shown in FIGS. 2 and 3 is identical to the rafter hanger described above. Each of the floor joists 60 have one end connected to a log wall 62 by a floor joist hanger 30. The other end of each floor joists 60 may also be connected to a log wall by a floor joist hanger 30. The other end can also rest on top of a horizontal support if it does not butt up to a second wall. After the floor joists 60 are all in place, the flat head bolts 52 and nuts 54 are tightened to form a rigid hanger 30. Lag-screws 55 pass through bores 34 and 36 through the saddle member 38 and screw into a floor joist 60. The lag-screws 50 extend into a log 46 radially toward the log axis Y.

A line is placed on a log 46 to indicate where the saddle supports 40 are to be attached. The line is parallel to a long axis Y of the log 46 and horizontally spaced from the long axis. The horizontal center of the base plate 42 is centered on the line. A small bore 68, through which the line can be seen is provided to insure accurate placement of the saddle supports 40.

The line is positioned as required when the rafter hanger 30 is to support rafters 27. Generally the top edge of each rafter 27 is in a plain that is tangent to an upper surface of the log 46. A different position of the rafter 27 is shown in FIG. 1. After the rafters 26 are in place as shown in FIG. 1, and the bolts 52 and nuts 54 are tightened, the roof deck is attached to the top of the rafters 27. The axis of the bolts 52 intersects the axis X of the saddle member 38. The axis X also substantially intersects the axis of a joist 60 or rafter 27.

The floor joist 60 and rafters 27 can be larger or smaller in diameter than the log 46 in a wall 62 to which the saddle supports 40 are attached. If there is a difference in log diameters, the base plates 42 must have an arc radius that corresponds to the radius of the log 46 to which they are attached and the saddle 38 must have a radius that corresponds to the radius R of the rafter 27 or floor joist 60 to which it is attached. The location of the line for aligning the saddle supports 40 can be selected to obtain the desired relationship between the floor joist 60 or rafters 27 and the horizontal log 46 to which they are attached.

Figure 6:
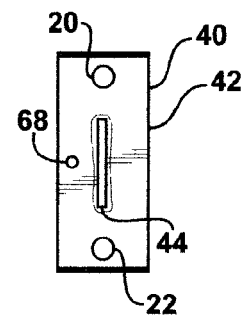
FIG. 6 is an end view of a saddle support.
Figure 7:
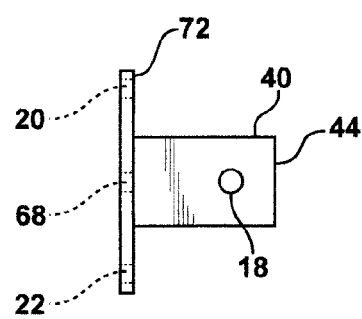
FIG. 7 is a side view of a modified saddle support.

There is a need to attach the end of a log 27 or 60 to a flat vertical wall surface in some construction. The hangers 30 accommodate such construction by using modified saddle supports 40 shown in FIG. 7. The modified saddle support 40 has a base plate 72 that is flat in place of the arcuate base plates 40 shown in FIGS. 1, 2 and 6.

The disclosed embodiment is representative of a presently preferred form of the invention, but is intended to be illustrative rather than definitive thereof. The invention is defined in the claims.

What is claimed is:

1. A log hanger assembly comprising:

a first saddle support with a first base plate that is an arcuate member with a first base plate radius that is equal to a first log radius of a first log, with at least two first base plate bores for at least two first base plate mounting fasteners each of which extends through one of the at least two first base plate bores and radially into the first log, a first post fixed to the first base plate and extending outwardly from the first base plate and the first log, and a first post bore through the first post;

a second saddle support with a second base plate that is an arcuate member with a second base plate radius that is equal to the first log radius of the first log, with at least two second base plate bores for at least two second base plate mounting fasteners each of which extends through one of the at least two second base plate bores and radially into the first log, a second post fixed to the second base plate and extending outwardly from the second base plate and the first log, and a second post bore through the second post;

a saddle member with a semicircular section that extends one hundred and eighty degrees about a saddle axis, including a semicircular section first end and a semicircular section second end, and a pair of saddle member free ends that are parallel to each other and extend from the semicircular section first end and the semicircular section second end, a first saddle bore through the saddle member at the semicircular section first end, a second saddle bore through the saddle member at the semicircular section second end, and at least two log fastener bores through the semicircular section and wherein the semicircular section has a semicircular section radius that is the same as a second log radius of a second cylindrical log attached to the saddle member;

a first bolt extending through the first saddle bore and through the first post bore and pivotally attaching the first saddle support to the saddle member;

a second bolt extending through the second saddle bore and through the second post bore and pivotally attaching the second saddle support to the saddle member and wherein the first bolt and the second bolt are coaxial; and at least two saddle member fasteners each of which extends through one of the at least two log fastener bores and radially into the second cylindrical log.

2. A log hanger assembly, as set forth in claim 1, wherein tightening the first bolt clamps the saddle member to the first saddle support and tightening the second bolt clamps the saddle member to the second saddle support.

3. A log hanger assembly, as set forth in claim 1 including a first alignment aperture through the first base plate and a second alignment aperture through the second base plate.

* * * * *